(12) United States Patent
Chavan et al.

(10) Patent No.: US 10,603,615 B2
(45) Date of Patent: Mar. 31, 2020

(54) FILTER MEDIUM

(71) Applicant: Ahlstrom-Munksjö Oyj, Helsinki (FI)

(72) Inventors: Santosh Chavan, La Mulatiere (FR); Praveen Jana, Adams, TN (US); Anne Viskari, Lempaala (FI)

(73) Assignee: Ahlstrom-Munksjö Oyj, Helsinki (FI)

( * ) Notice: Subject to any disclaimer, the term of this patent is extended or adjusted under 35 U.S.C. 154(b) by 0 days.

(21) Appl. No.: 16/374,199

(22) Filed: Apr. 3, 2019

(65) Prior Publication Data

US 2019/0224598 A1    Jul. 25, 2019

Related U.S. Application Data

(62) Division of application No. 14/902,136, filed as application No. PCT/EP2014/063696 on Jun. 27, 2014, now Pat. No. 10,293,288.

(30) Foreign Application Priority Data

Jul. 2, 2013   (EP) ..................... 13174672

(51) Int. Cl.
*B01D 53/02* (2006.01)
*B01D 39/14* (2006.01)
*B01D 39/16* (2006.01)
*B01D 39/20* (2006.01)

(52) U.S. Cl.
CPC ......... *B01D 39/14* (2013.01); *B01D 39/1623* (2013.01); *B01D 39/2017* (2013.01); *B01D 39/2024* (2013.01); *B01D 2239/0636* (2013.01); *B01D 2239/0654* (2013.01); *B01D 2239/0681* (2013.01); *B01D 2239/1233* (2013.01)

(58) Field of Classification Search
CPC .... B01D 2239/0636; B01D 2239/0654; B01D 2239/0681; B01D 2239/1233; B01D 39/14; B01D 39/1623; B01D 39/2017; B01D 39/2024
See application file for complete search history.

(56) References Cited

U.S. PATENT DOCUMENTS

| 5,672,399 A * | 9/1997 | Kahlbaugh ............ B01D 27/06 428/36.1 |
| 6,165,572 A * | 12/2000 | Kahlbaugh ............ B01D 27/06 428/36.1 |
| 6,171,684 B1 * | 1/2001 | Kahlbaugh ............ B01D 27/06 428/212 |
| 6,723,669 B1 * | 4/2004 | Clark ....................... D04H 3/16 442/329 |
| 2004/0076564 A1 * | 4/2004 | Schild ....................... A61L 2/26 422/292 |
| 2010/0252510 A1 * | 10/2010 | Godsay ................ B01D 39/163 210/806 |

* cited by examiner

*Primary Examiner* — Christopher P Jones
(74) *Attorney, Agent, or Firm* — Edwin A. Sisson, Attorney at Law, LLC; Jeffrey J. Banyas

(57) ABSTRACT

The present invention relates to a filter medium comprising a substrate and a fine fiber layer on top of the substrate, wherein the substrate comprises a first layer comprising first fibers having a first average diameter and a first maximum fiber length;

a second layer comprising second fibers having a second average diameter and a second maximum fiber length; and a third layer comprising third fibers having a third average diameter and a third maximum fiber length;

wherein the boundary area between the first and the second layer forms a first blended area comprising first and second fibers; and the boundary area between the second and the third layer forms a second blended area comprising second and third fibers;

and wherein the first and the third average diameters are each larger than the second average diameter.

16 Claims, 3 Drawing Sheets

FILTER MEDIUM

PRIORITIES AND CROSS REFERENCES

This Application claims the benefit of priority of U.S. application Ser. No. 14/902,136 filed on 30 Dec. 2015, International Application No. PCT/EP2014/063696 filed on 27 Jun. 2014, and European Application No. 13174672.9 filed on 2 Jul. 2013, the teachings of each of which are incorporated herein by reference in their entirety.

The present invention relates to a novel filter medium, a process for the preparation of the medium, a filter package including the medium and the use of the medium in a method of filtering a gas or a liquid. Specifically, the invention relates to a filter medium that is efficient in the removal of particulates without causing a significant pressure drop.

There is an increasing need to filter impurities from the atmosphere, vapors and fluids. Specifically, air intake filtration in the transportation area as well as in the field of gas turbines requires media that are efficient in terms of particulate removal. Moreover, indoor air quality is becoming important as respiratory illnesses, allergy and asthma symptoms occur with increasing frequency in industrialized civilization. While heating, ventilation and air conditioning (HVAC) filters can provide high particulate removal capability, these filters also create significant air flow resistance. As a result, high efficiency HVAC filter systems require powerful fans to move air. Likewise, prior art media for air intake applications in gas turbines and transportation lead to an increased energy consumption. This goes along with tremendous $CO_2$ emission.

Prior art filter media use inorganic and synthetic fibers for the filtration of, e.g. air. By definition, the filters' energy consumption increases over time because their resistance to air flow increases with the amount of particulates which are removed from the air.

Unfortunately, prior art media show a significant increase in their resistance to air flow as they fill up easily with dust and fine particulates. When these particulates are removed from the air, the energy consumption, therefore, increases.

To ensure sufficient particle removal, prior art suggests filter media that are made of multiple layers of different porosities. U.S. Pat. No. 4,661,255 teaches the use of a multiple layer material wherein the porosity decreases in the direction of flow. That is, the individual layers have increasingly fine or narrow pores. Such media, however, are not satisfactory because small and bigger particulates tend to clog the media very easily over time. As a consequence, air flow resistance increases quickly.

It is thus an object of the present invention to provide an improved filter medium that avoids the risk of early clogging. It is a further object of the present invention to provide a filter medium which avoids or at least reduces the pressure drop observed over time to thus minimize total average air flow resistance. It is another object of the present invention to avoid an early onset of an increasing pressure drop.

In a first aspect the present invention therefore relates to a filter medium as defined in claim 1. Preferably, the filter medium comprises a substrate and a fine fiber layer on top of the substrate, wherein the substrate comprises
a first layer comprising first fibers of at least 80% synthetic staple fibers having an average diameter of 6-45 μm, preferably 7-38 μm, most preferably 7-17 μm;
a second layer comprising second fibers of at least 10% micro fibers having an average diameter of 0.4-5 μm, preferably 0.6-2.6 μm; and
a third layer comprising third fibers of at least 80% synthetic staple fibers having an average diameter of 6-45 μm, preferably 7-38 μm, most preferably 7-17 μm;
wherein
the boundary area, i.e. the area of contact, between the first and the second layer forms a blended area comprising first and second fibers; and
the boundary area between the second and the third layer forms a blended area comprising second and third fibers.

Staple fibers as used herein are short cut fibers that are not longer than 45 mm.

Microfibers as used herein are fibers having an average diameter of 0.4-5 μm and a maximum length of 45 mm, preferably 18 mm, more preferably 10 mm, most preferably 3 mm.

It has been found that the filter medium described herein is capable of removing particulates in an efficient manner without causing a significant increase in pressure drop. That is, the filter medium of the present invention exhibits a lower pressure drop at a given particle removal efficiency compared to prior art media.

FIG. 1 shows typical pressure drop curves for a given efficiency for commercially available filter media (MG media), for commercially available spunbond filter media with a nanolayer and for the product of the invention.

In a second aspect, the present invention relates to a process as defined in claim 16. In a preferred embodiment, the process comprises the steps of
providing first, second and third homogeneous slurries;
supplying the first slurry onto a dewatering screen to form a first deposit;
supplying the second slurry onto the first deposit to form a second deposit on top of the first deposit;
supplying the third slurry onto the second deposit to form a third deposit on top of the second deposit;
removing the water from the deposits to form a wet fibrous mat or sheet;
drying the wet fibrous mat or sheet while heating to form a substrate; and
applying a fine fiber layer on top of the substrate;
wherein
the first slurry comprises water and first fibers having at least 80% synthetic staple fibers an average diameter of 6-45 μm, preferably 7-38 μm, most preferably 7-17 μm;
the second slurry comprises water and second fibers having at least 10% of microfibers, preferably microfibers having a diameter of 0.4-5 μm, most preferably a diameter of 0.6-2.6 μm; and
the third slurry comprises water and third fibers having a least 80% synthetic staple fibers having an average diameter of 6-45 μm, preferably 7-38 μm, most preferably 7-17 μm.

Third and fourth aspects of the invention relate to filter elements including the filter medium and to the use of the filter medium in a method of filtering a gas or a liquid, in particular in Heating Ventilation and Air Conditioning filters and Gas Turbine intake air filtration applications.

DETAILED DESCRIPTION OF THE INVENTION

Figure 1:
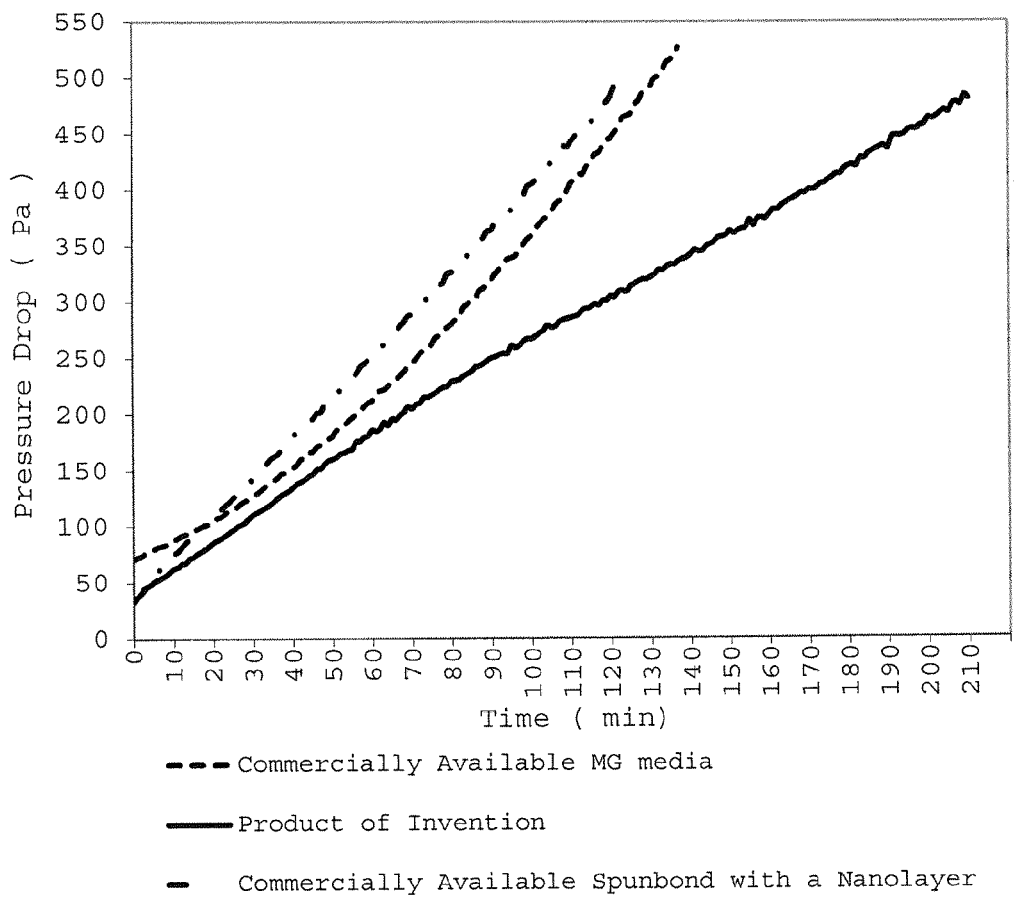
FIG. 1 is a chart showing a pressure drop curve for a commercially available filter media.
Figure 2:
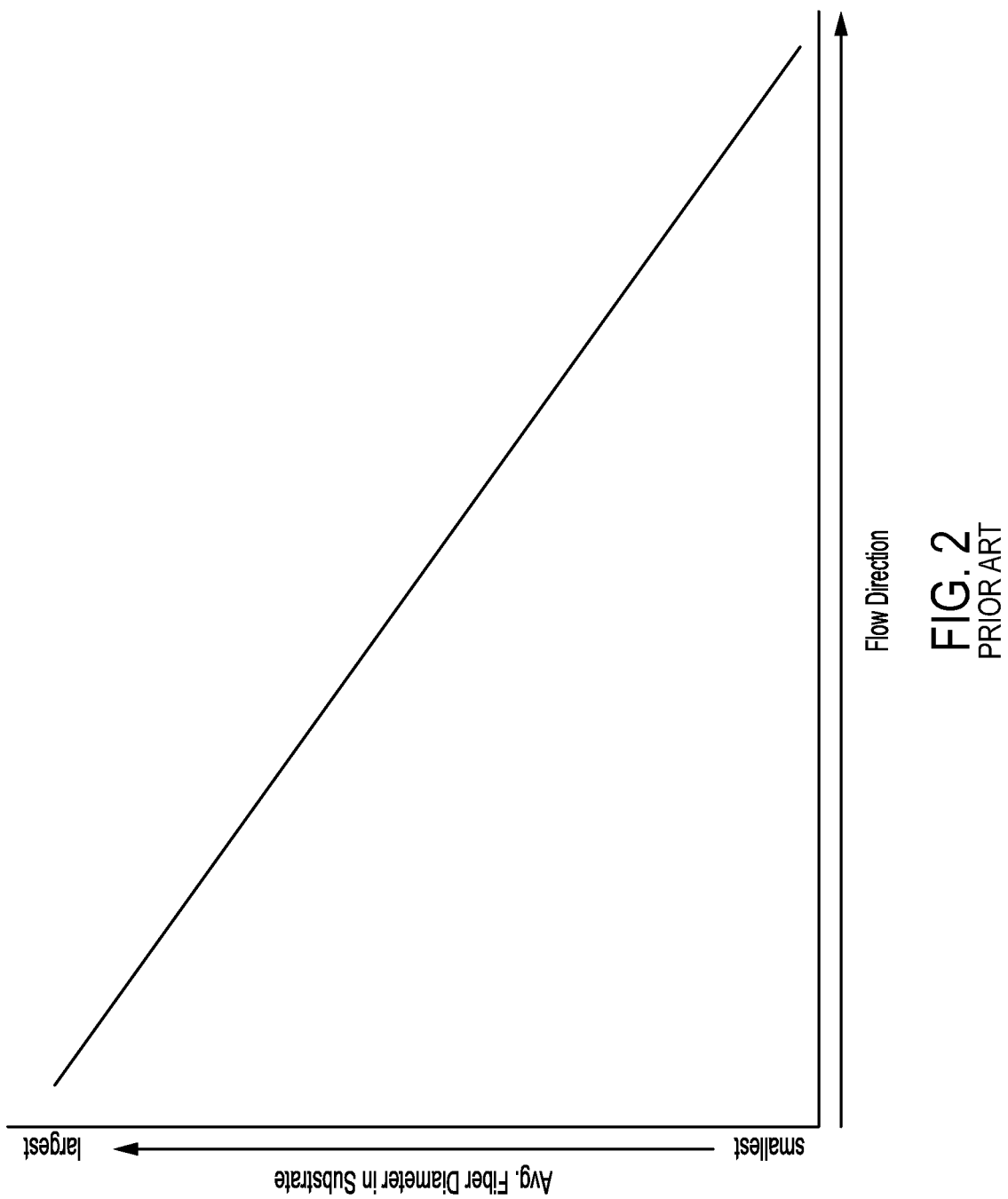
FIG. 2 is a chart showing a prior art distribution of average fiber diameter in a filter substrate.
Figure 3:
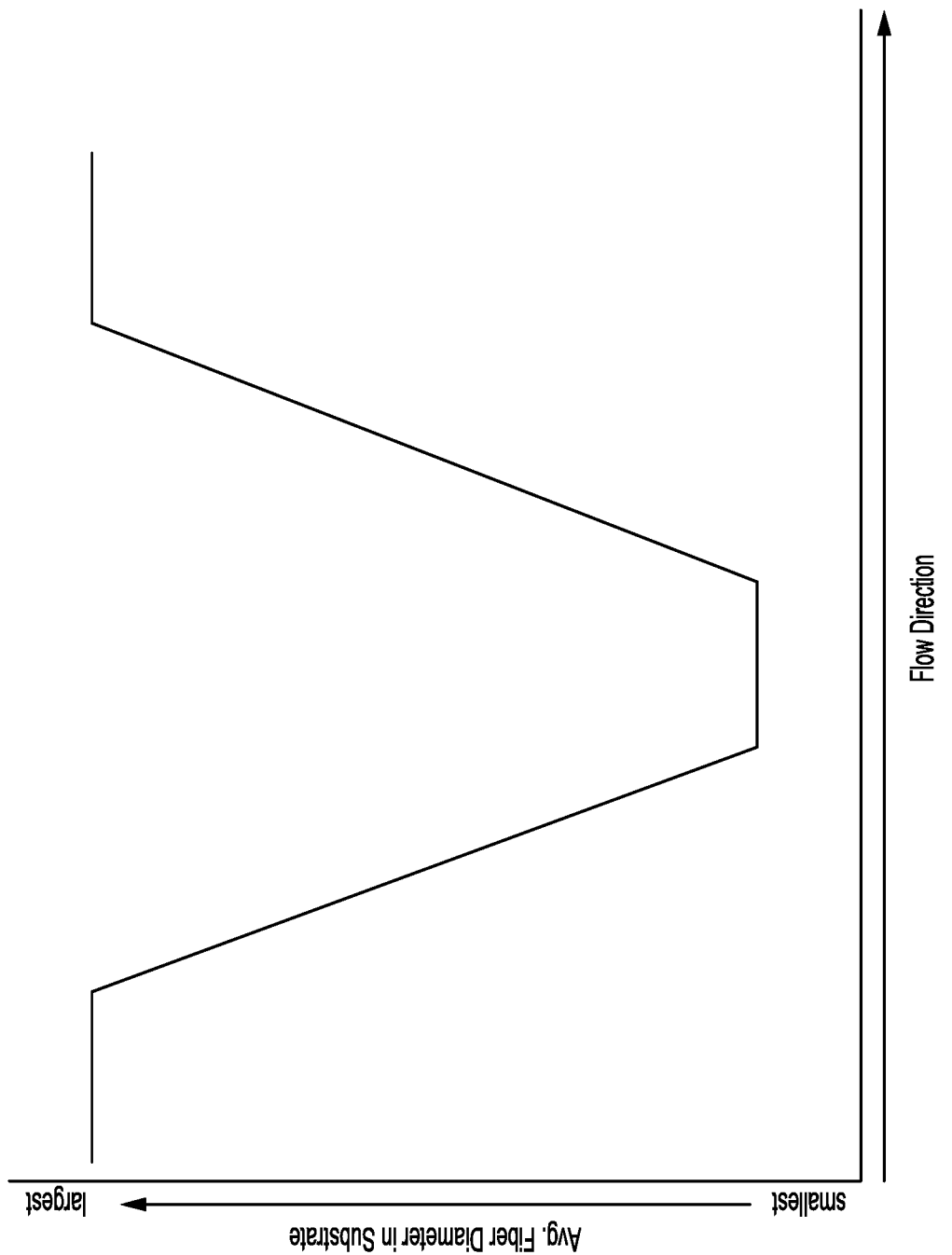
FIG. 3 is a chart showing a distribution of average fiber diameter in an embodiment of the invented filter media.

The filter medium of the present invention comprises a substrate and a fine fiber layer on top of the substrate. In a preferred embodiment, the fine fiber layer is deposited on the first layer. The substrate comprises a first, a second, and a third layer.

Substrate

As used herein, the first layer of the substrate comprises first fibers having a first average diameter and a first maximum fiber length.

The second layer comprises second fibers having a second average diameter and a second maximum fiber length.

Likewise, the third layer comprises third fibers having a third average diameter and a third maximum fiber length.

As used herein, the term first, second and third average diameter relates to the average diameter of the first, second and third fibers, respectively. These first, second and third fibers are contained in the first, second and third layers, respectively.

In a preferred embodiment, the first, and the third fibers form the dominating material in the first, and the third layer, respectively. In this context, the term dominating material is to be understood such that the first, and the third layer contain significant amounts of the first, the third fibers, respectively. In a preferred embodiment, these layers essentially consist of the individual fibers. That is, the first layer may essentially consist of the first fibers; and the third layer may essentially consist of the third fibers. In a most preferred embodiment, the first and third layer contains up to 80 wt. % of the first and third fibers respectively.

In a preferred embodiment, the second fibers are those having the smallest average diameter of all fibers in the second layer. In a preferred embodiment the second layer contains at least 10 wt. %, most preferably at least 30 wt. %. of these second fibers having the smallest diameter of all fibers in the second layer.

Each of the first, the second and the third fibers may be a mixture of two or more fibers. That is to say, the first fibers may be a mixture of two or more types of fibers; the second fibers may be a mixture of two or more types of fibers; and the third fibers may be a mixture of two or more types of fibers.

Between the first and the second layers there is a boundary area (herein after also referred to as first boundary area). This boundary area, which is the area of contact between the first and the second layer, comprises a mixture of the first and the second fibers and, thus, forms a blended area. If at least one of the first and the second fibers comprises two or more sorts of fibers, then this blended area preferably comprises all components that form the first and the second fibers.

Likewise, there is a boundary area between the second and the third layer which area comprises a mixture of the second and the third fibers. Accordingly, this boundary area (herein after also referred to as second boundary area) which is the area of contact between the second and the third layer, forms a blended area of second and third fibers. The blended area preferably comprises all components that form the second and the third fibers. The second boundary area may have a smaller thickness than the first boundary area if the first boundary area results from first providing the first slurry onto the dewatering screen to form the first deposit followed by supplying the second slurry onto the first deposit as described with regard to the process within this invention.

The first and the third average diameters are larger than the second average diameter. It is believed that this arrangement of fibers results in a substrate wherein the first and the third layers have a structure of higher porosity/openness than the second layer which is located in between the first and the third layer.

In a preferred embodiment, the average diameters of the first and the third fibers are each independently of from 6-45 μm, preferably of from 7-38 μm, and most preferably of from 7-17 μm.

In a further embodiment, the maximum fiber length of the first and the third fibers (hereinafter also referred to as first and third maximum fiber length) independently from each other is up to 45 mm, preferably up to 24 mm, and most preferably up to 12 mm.

Average fiber diameters and maximum fiber lengths can be determined by way of scanning electron microscopy (SEM) using a Phenom scanning electrom microscope (available from FEI) integrated with Fibermetric software (Phenom World, The Netherlands).

The first and the third fibers are independently from each other selected from at least one of the group consisting of natural fibers, polymeric fibers and inorganic fibers. Preferably, the first and the third fibers are independently from each other selected from at least one of the group consisting of polymeric fibers and inorganic fibers.

Examples of natural fibers include fibers or derivatives of natural fibers such as cellulose, lyocell, viscose or any other derivatives of cellulosic fibers.

Polymeric fibers in the context of the present invention include polyester, polyethylene, polyethylene terephthalate, poly butylene terephthalate, poly amide, poly propylene, acrylic, bicomponent fibers of PET-CoPET, PE-PET, and the like. In a preferred embodiment, the polymeric fibers are selected from the group consisting of polyethylene, polyethylene terephthalate, polypropylene, polybutylene terephthalate and polyamide.

If the first and/or the third fibers are selected from inorganic fibers or include such fibers, then the inorganic fibers are preferably glass fiber strands or basalt fibers. Synthetic fibers as used herewithin are any fibers that are man-made and include polymeric, cellulosic and inorganic fibers.

In a further embodiment, the invention relates to a filter medium wherein the first fibers in the first layer and the third fibers in the third layer independently from each other are present in an amount of at least 65 weight % based on the total fiber weight of the first and the third layer, respectively. In a preferred embodiment, the amount of the first and the third fibers in the first and the third layer, respectively, is at least 80 weight % or more.

The substrate of the filter medium comprises a second layer comprising second fibers. These fibers have an average diameter (herein also referred to as second average diameter). In a preferred embodiment, the second average diameter is of from 0.4-5 μm, preferably of from 0.6-2.6 μm; and/or wherein the second maximum fiber length is 18 mm, preferably 10 mm, more preferably 3 mm. The second fibers are preferably selected from the group consisting of synthetic fibers and microglass fibers. Examples of synthetic fibers include polyester, polyethylene terephthalate, poly butylene terephthalate, poly amide, poly propylene, acrylic, bicomponent fibers of PET-CoPET, PE-PET, and the like. Preferred examples of synthetic fibers are polyester, polyethylene, polyethylene terephthalate, poly butylene terephthalate, bicomponent fibers of PET-CoPET, PE-PET, and the like. Examples of microglass fibers are B Glass, C glass, both air attenuated and flame attenuated. Preferred examples of microglass fibers include borosilicate chopped glass fibers having a diameter of 0.6 and 1.0 micron (LFI, Germany).

In a preferred embodiment, the second fibers in the second layer are present in an amount of at least 10 weight %, preferably at least 20 weight %, most preferably at least 30% based on the total weight of the second layer.

As described herein above, the average diameters of the first and the third fibers (also referred to herein as first and third fibers) are larger than the average diameter of the second fibers (second average diameter).

Without wishing to be bound by theory, it is believed that this specific selection gives an arrangement of fibers wherein the second layer of the substrate comprises the smallest fibers within the substrate. it is believed that this arrangement translates into a structure wherein the pores between the fibers in the second layer are particularly small, whereas the first and the third layers have a higher porosity or openness. Given that the first and the third average fiber diameters are larger than the second average diameter, this profile can be described as converging and diverging pore size. While it is undesirable to have small diameter fibers in the first and third layers, (small) amounts that do not interfere with the converging diverging pore structure of the media are considered within the scope of this invention. It is believed that such a converging and diverging pore size is of particular value for filtering particulates with lower pressure drops and thus energy savings in HVAC applications and other filtering applications.

In a preferred embodiment of the invention, the ratio of the first and the second average diameters ($D_{1st}/D_{2nd}$) and the ratio of third and the second diameters $D_{3rd}/D_{2nd}$) are each independently from each other of from 1.2 to 115, preferably of from 1.4 to 43.

In a further embodiment of the invention, at least one of the first, the second and the third layer contains a further sort of fibers in addition to the first, the second and the third fibers. This further sort of fibers can be understood as an additional structural type of fibers. That is, the first, the second and the third layer may contain other fibers than the first, the second and the third fibers. Preferably, this additional sort of fibers is selected from binder fibers, preferably bicomponent fibers and glass fiber strands. In a most preferred embodiment, the first, the second and/or the third layer contains bicomponent fibers and glass fiber strands.

Bicomponent fibers are fibers usually containing more than one polymer. They can have a core and sheath structure.

Preferably, further sorts of fibers are contained in the first, the second and/or the third layer in an amount of from 2-70 weight % based on the total fiber weight of the first, the second and the third layer, respectively.

In a further preferred embodiment, the first, the second and the third layer are essentially free from natural fibers such as cellulose. It has been found that filter efficiency and pressure drop characteristics are particularly good during the filtration of gas such as air when the substrate contains no natural fibers that tend to attract moisture or oil or interact with salt from the surroundings. Without wishing to be bound by theory, it is believed that such natural fibers attract water. Moreover, fibers such as cellulose were found to bind oil and salt. This may lead to a swelling or clogging of the fibers which results in a loss of filter efficiency and also goes along with a significant increase in pressure drop.

Fine Fiber Layer

The filter medium of the present invention comprises a fine fiber layer on top of the substrate. In a preferred embodiment, the fine fiber layer is deposited on top of the first layer which is described herein above. In a further embodiment, the fine fiber layer adheres to the substrate of the filter medium, preferably to the first layer, by means of an adhesive. Accordingly, the filter medium preferably comprises an adhesive between the substrate, preferably the first layer, and the fine fiber layer.

In a preferred embodiment, the fine fiber layer is deposited by any process that forms sub micronic fibers on the side of the first layer that was adjacent to the dewatering screen during the formation process.

The adhesive can be any adhesive that can be spray-coated, roll coated, rod coated, metered or otherwise applied onto the substrate. Preferably, the adhesive is selected from a water-based polymer dispersion selected from the group consisting of polyurethane and polyacrylic based adhesives. In a preferred embodiment, the adhesive is applied to the substrate in a manner such that it does not affect the permeability of the substrate. That is, the adhesive preferably is applied with a coat weight of less than 4 $g/m^2$.

In a further embodiment, the fine fiber layer is attached to the substrate of the filter media by lamination, hot melt adhesive, ultrasonic bonding or point bonding.

In yet another embodiment of the invention, the fine fiber layer that is applied to the substrate can be deposited on a further layer (herein after also referred to as carrier and/or support) before being transferred to the substrate comprising the first, the second and the third layer. In this embodiment, the carrier preferably comprises fibers similar to those forming the dominating material in the layer of the substrate that is adjacent to the carrier/support. The term "similar to those forming the dominating material in the layer of the substrate" in the context of the present invention means that the carrier/support and the substrate layer adjacent to it both comprise fibers which are similar with regard to its raw material, average diameter and/or maximum fiber length. In a particularly preferred embodiment, the fibers in the carrier/support and the substrate layer adjacent to it are selected such that the fibers forming the dominating material in the respective layer have a similar average diameter. In a further or different embodiment of the invention, the first and/or third fibers may be cut fibers having a maximum fiber length, whereas the carrier/support may comprise continuous fibers with a relatively higher length, wherein both types of fibers are made from the same type of polymer.

When the fine fiber layer is deposited on a carrier/support, the fine fiber layer which is applied on top of the substrate thus contacts the substrate via an intermediate layer. This intermediate layer does not amend the overall arrangement within the substrate wherein the average diameters of the first and the third fibers are larger than the average diameter of the second fibers. As explained herein above, selecting the average diameters of the first and the third fibers to be larger than the second fibers gives an arrangement of fibers wherein the second layer of the substrate comprises the smallest fibers within the substrate. This arrangement is believed to translate into a structure wherein the pores between the fibers in the second layer are particularly small whereas the first and the third layers have a higher porosity or openness. This profile of individual average fiber diameters does not change when the fine fiber layer is applied to the substrate with the aid of a carrier and/or support wherein the carrier/support essentially consists of a material similar to the material forming the material of the first or the third layer whichever is in contact with the carrier/support. That is to say, the dominating material within the carrier/support may in one embodiment of the invention be identical to the first or the third fibers that form the dominating material in the first, and the third layer, respectively. In this context, the expression "preferably identical" relates to the raw material forming the fibers, to the average diameter and/or to the maximum fiber length. In a particularly preferred embodiment of the invention, the carrier/support essentially consists of the same fibers as the first or the third layer.

In such an embodiment, the first or the third layer within the substrate that is in contact with the carrier/support can thus equally be viewed at as forming a modified first or third layer (herein after also referred to as first' layer or third' layer). When looking at the filter medium from such a perspective, it is readily understood that the carrier/support can also be defined as a fourth, i.e. separate layer within the substrate. Whether or not the carrier/support is considered as part of a first' or third' layer or, alternatively, as a fourth layer within the substrate, is not so important as long as the carrier/support does not amend the overall fiber arrangement wherein the pores between the fibers in the second layer are particularly small whereas the first' and the third' layers have a higher porosity or openness. When using a carrier/support to attach the fine fiber layer to the substrate, it is thus readily understood that the carrier/support providing the contact between the fine fiber layer and the substrate preferably does not contain small diameter fibers in an amount that would interfere with the converging-diverging pore structure of the substrate. Using a carrier/support to attach the fine fiber layer to the substrate therefore does not alter the converging and diverging pore size which was found to be of particular value for filtering particulates with lower pressure drops and thus energy-savings in HVAC applications and other filtering applications.

The fine fiber layer comprises fine fibers having an average diameter up to 3 μm. In a preferred embodiment, the fine fiber layer comprises sub-micronic fibers. Sub-micronic fibers in the context of the present invention are defined by an average fiber diameter of below 1 μm. In a preferred embodiment, the fine fiber layer, therefore, comprises fibers having an average fiber diameter of from 0.08-0.8 μm, preferably of from 0.1-0.4 μm.

In a preferred embodiment, the sub-micronic fibers are polymeric fibers. Preferably, these fibers are selected from the group consisting of polyamide, polyester, polyethylene terephthalate, polypropylene, polycarbonate, polyurethane, polybutylene terephthalate and polyvinylidene fluoride fibers. In a further embodiment, the fine fiber layer entirely consists of these sub-micronic fibers.

In a further embodiment, the filter medium comprises a protective layer on top of the fine fiber layer. That is, the fine fiber layer is preferably covered by a protective layer. The protective layer can be any type of layer that is preferably selected from the group consisting of polyester, polyethylene, polyethylene terephthalate, poly butylene terephthalate, polypropylene, polyamide or any combination of the above fibers and combinations hereof with PE-PET or PET-coPET bicomponent fibers.

It has been found that the filter medium described herein has excellent mechanical properties. In particular, the present medium shows a very high bending stiffness of at least 500 mg as obtained from its bending resistance according to TAPPI Standard T 543 (Gurley-type tester). The medium can also be pleated and can maintain its shape without significant deformation during use. Moreover, the medium withstands back-pulsed applications wherein the flow of the fluid (i.e. a liquid or a gas) is reversed to effectively clean the medium. In back-pulsed jet applications, the fine fiber layer is on the upstream side of the media. The medium also has a high pore volume within the substrate which allows for high permeability values. Preferably, the air permeability of the inventive medium is at least 5 cfm as measured according to ASTM D737, for an area of 38 $cm^2$ and a pressure of 125 Pa. It has been further found that the filter medium according to the invention has a filtration efficiency of more than 35% against 0.4 micron particles at a face velocity of 5.3 cm/s when tested using a Palas MFP-30000 Filter Test System (Palas GmbH, Karlsruhe, Germany) connected to a RBG 1000 dust feeder according to EN 779 test method.

Surprisingly, the medium shows a reduced pressure drop over time as compared to prior art filter media, that have similar mechanical properties and particle removal characteristics.

Process for the Preparation of the Filter Medium

The process for the preparation of the filter medium preferably comprises the steps of providing first, second and third homogeneous slurries;

supplying the first slurry onto a dewatering screen to form a first deposit;

supplying the second slurry onto the first deposit to form a second deposit on top of the first deposit;

supplying the third slurry onto the second deposit to form a third deposit on top of the second deposit;

removing the water from the deposits to form a wet fibrous mat or sheet;

drying the wet fibrous mat or sheet while heating to form a substrate; and applying a fine fiber layer on top of the substrate;

wherein the first slurry comprises water and the first fibers described herein above having at least 80% synthetic staple fiber having a diameter of 6-45 μm;

the second slurry comprises water and the second fibers described herein above having at least 10% micro fibers having an average diameter of 0.4-5 μm; and the third slurry comprises water and the third fibers described herein above having at least 80% synthetic staple fiber having a diameter of 6-45 μm.

In this process, first, second and third homogenous slurries are provided. These slurries can be provided by any method known in the art such as by adding and mixing the fibers in water.

As used herein, the first homogeneous slurry comprises water and the first fibers preferably having at least 80% synthetic staple fiber having a diameter of 6-45 μn. Likewise, the second slurry comprises water as well as the second fibers preferably having at least 10% micro fibers having an average diameter of 0.4-5 μm. Moreover, the third slurry comprises water and the third fibers preferably having at least 80% synthetic staple fiber having a diameter of 6-45 μn.

Once the first, the second, and the third homogeneous slurries are prepared, they are applied onto a dewatering screen. This screen can be any screen commonly used in a paper making process. Preferably, this screen is a dewatering endless screen. Upon supplying the first slurry onto the dewatering screen, a first deposit is formed on the screen. Subsequently, the second slurry is supplied onto the first deposit to form a second deposit on top thereof. Then, the third slurry is supplied onto the second deposit to form a third deposit on top of the second deposit. Supplying the first, the second and the third slurries can be carried out by using different channels of a headbox of a wetlaid forming machine. Alternatively, the slurries can be applied one after the other using an dynamic handsheet former from Techpap SAS (Grenoble, France).

During or after deposition of the individual slurries, water is removed to form a wet fibrous mat or sheet. Subsequently, the wet fibrous mat or sheet is dried while heating to form the substrate. This substrate—as defined herein above—comprises the first, the second, and the third layer comprising the individual fibers.

It is believed that applying the first, the second, and the third slurries on top of each other results in a boundary area between adjacent layers which forms a blended area comprising first and second or third and second fibers.

Within the boundary area, the components of the first and second and the components of the third and second layers intermingle with each other such that there is a fibrous interlock rather than a sharp and defined edge which would separate the individual layers from each other.

Without wishing to be bound by theory, the inventors believe that this boundary area results in a smooth or semi-continuous gradient wherein the fiber average diameter of the fibers that are contained in the substrate decreases from the outer layers to the mid-layer of the substrate. It is believed that this fiber arrangement results in a converging-diverging pore size distribution which may be regarded as converging and diverging pore size across the thickness of the filter medium. This arrangement was found to be particularly valuable in filtering applications.

It is believed that unlike conventional media with a decreasing pore size gradient, this unique media structure allows for the early capture of large particles in the upstream region of the filter media, smaller particles being trapped in the converging region, followed by a decrease in the face velocity of remaining particles as they enter the diverging region. This reduction in face velocity and increasing pore structure allows for a better distribution of the remaining particles across the fine fiber layer as the fluid exits the filter, thus having a lower impact on the pressure drop.

Accordingly, the filter medium of the present invention is preferably used in a way such that the fluid to be filtered exits the filter medium at the side of the substrate upon which the fine fiber layer is allocated.

What is claimed is:

1. A method for the use of a filter medium in filtering a fluid, in particular in heating ventilation and air conditioning filters and gas turbine intake air filtration applications, said fluid comprising particles, said filter medium comprising a substrate and a fine fiber layer on top of the substrate, wherein the substrate comprises
   a first layer comprising first fibers having a first average diameter and a first maximum fiber length;
   a second layer comprising second fibers having a second average diameter and a second maximum fiber length; and
   a third layer comprising third fibers having a third average diameter and a third maximum fiber length;
   wherein
      the boundary area between the first and the second layer forms a first blended area comprising a first homogeneous mixture of first and second fibers; and
      the boundary area between the second and the third layer forms a second blended area comprising a second homogeneous mixture of second and third fibers;
   and wherein the first and the third average diameters are each larger than the second average diameter; and
   wherein the method comprises the steps of:
      a. introducing the fluid to the filter medium at an entry side corresponding to the third layer,
      b. passing the fluid through the third layer to capture a first amount of the particles having a first average particle size,
      c. passing the fluid through the second layer to capture a second amount of the particles wherein said second amount of the particles has a second average particle size,
      d. passing the fluid through the first layer,
      e. passing the fluid through the fine fiber layer to capture a third amount of the particles, and
      f. removing the fluid from the filter medium at an exit side corresponding to the fine fiber layer.

2. A method for the use of a filter element including a filter medium in filtering a fluid, in particular in heating ventilation and air condition filters and gas turbine intake air filtration applications, said fluid comprising particles, said filter medium comprising a substrate and a fine fiber layer on top of the substrate, wherein the substrate comprises
   a first layer comprising first fibers having a first average diameter and a first maximum fiber length;
   a second layer comprising second fibers having a second average diameter and a second maximum fiber length; and
   a third layer comprising third fibers having a third average diameter and a third maximum fiber length;
   wherein
      the boundary area between the first and the second layer forms a first blended area comprising a first homogeneous mixture of first and second fibers; and
      the boundary area between the second and the third layer forms a second blended area comprising a second homogeneous mixture of second and third fibers;
   and wherein the first and the third average diameters are each larger than the second average diameter; and
   wherein the method comprises the steps of:
      a. introducing the fluid to the filter medium at an entry side corresponding to the third layer,
      b. passing the fluid through the third layer to capture a first amount of the particles having a first average particle size,
      c. passing the fluid through the second layer to capture a second amount of the particles wherein said second amount of the particles has a second average particle size,
      d. passing the fluid through the third layer,
      e. passing the fluid through the fine fiber layer to capture a third amount of the particles, and
      f. removing the fluid from the filter medium at an exit side corresponding to the fine fiber layer.

3. The method of claim 1, wherein the second average particle size is smaller than the first average particle size.

4. The method of claim 1, wherein the step of passing the fluid through the first layer decreases a face velocity of the third amount of the particles.

5. The method of claim 1, wherein the filter medium has been pleated.

6. The method of claim 1, further comprising the step of:
   g. reversing the fluid flow to effectively clean the filter medium.

7. The method of claim 1, wherein the filter medium has a bending stiffness of at least 500 mg.

8. The method of claim 1, wherein the filter medium has an air permeability of at least 5 cfm.

9. The method of claim 1, wherein the filter medium has a filtration efficiency of more than 35% against 0.4 µm particles.

10. The method of claim 2, wherein the second average particle size is smaller than the first average particle size.

11. The method of claim 2, wherein the step of passing the fluid through the first layer decreases a face velocity of a third amount of the particles.

12. The method of claim 2, wherein the filter medium has been pleated.

13. The method of claim 2, further comprising the step of:
   g. reversing the fluid flow to effectively clean the filter medium.

14. The method of claim 2, wherein the filter medium has a bending stiffness of at least 500 mg.

15. The method of claim 2, wherein the filter medium has an air permeability of at least 5 cfm.

16. The method of claim 2, wherein the filter medium has a filtration efficiency of more than 35% against 0.4 μm particles.

* * * * *